(12) United States Patent
Brahmachary et al.

(10) Patent No.: US 11,892,930 B2
(45) Date of Patent: Feb. 6, 2024

(54) PERFORMANCE METRIC CALCULATIONS

(71) Applicant: Hewlett-Packard Development Company, L.P., Spring, TX (US)

(72) Inventors: Sandip Brahmachary, Pune (IN); Alok Bhatt, Pune (IN); Nileshkumar Gawali, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/730,875

(22) Filed: Apr. 27, 2022

(65) Prior Publication Data

US 2022/0350721 A1 Nov. 3, 2022

(30) Foreign Application Priority Data

Apr. 29, 2021 (IN) .............................. 202141019679

(51) Int. Cl.
*G06F 11/00* (2006.01)
*G06F 11/34* (2006.01)
*G06F 11/07* (2006.01)
*G06F 11/30* (2006.01)

(52) U.S. Cl.
CPC ...... *G06F 11/3409* (2013.01); *G06F 11/0757* (2013.01); *G06F 11/3006* (2013.01); *G06F 11/3075* (2013.01); *G06F 11/3466* (2013.01)

(58) Field of Classification Search
CPC .............. G06F 11/3452; G06F 11/008; G06F 11/0751; G06F 11/3466; G06F 11/0757; G06F 11/3006; G06F 11/3409; G06F 11/3447
See application file for complete search history.

(56) References Cited

U.S. PATENT DOCUMENTS

| 9,760,467 | B2 * | 9/2017 | Addleman | .......... G06F 11/3452 |
| 2012/0278663 | A1 * | 11/2012 | Hasegawa | ............. G06F 11/079 714/47.1 |
| 2015/0254125 | A1 * | 9/2015 | Kakui | ................... G06F 11/008 714/47.3 |

* cited by examiner

*Primary Examiner* — Charles Ehne
(74) *Attorney, Agent, or Firm* — Quarles & Brady LLP

(57) ABSTRACT

In some examples, a computing device can include a processor resource and a non-transitory memory resource storing machine-readable instructions stored thereon that, when executed, cause the processor resource to: generate a model of activity for the computing device, determine a time period for performing a calculation based on the model, wherein the calculation utilizes performance metrics associated with the computing device, activate an agent at a start time of the time period to perform the calculation, send, by the agent, a result of the calculation to a remote computing device, and deactivate the agent in response to sending the result.

15 Claims, 4 Drawing Sheets

PERFORMANCE METRIC CALCULATIONS

BACKGROUND

A computing device can allow a user to utilize computing device operations for work, education, gaming, multimedia, and/or other uses. Computing devices can be utilized in a non-portable setting, such as at a desktop, and/or be portable to allow a user to carry or otherwise bring the computing device along while in a mobile setting. These computing devices can be communicatively coupled to other computing devices and/or computing resources to perform particular functions.

DETAILED DESCRIPTION

Figure 1:
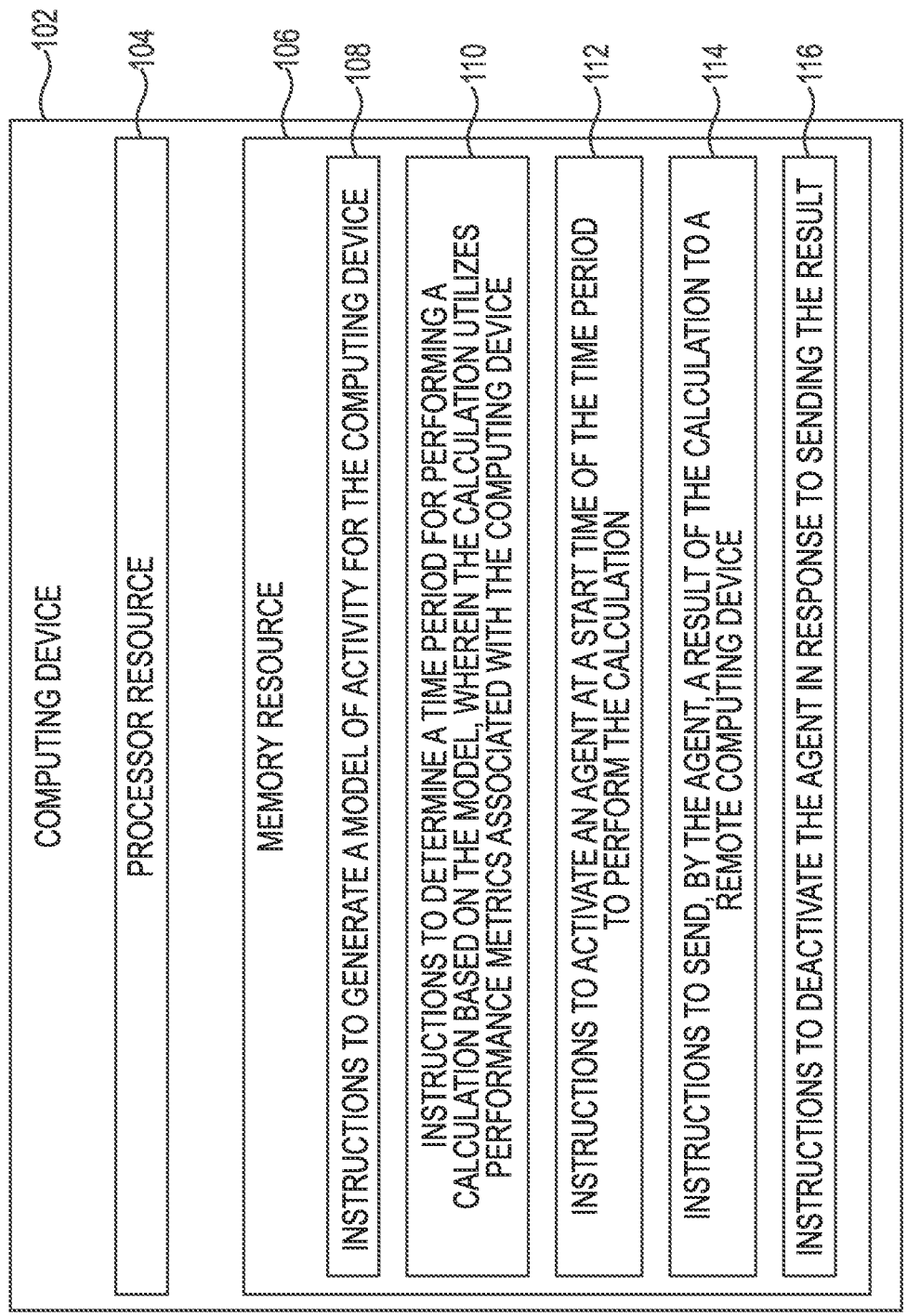
FIG. 1 illustrates an example of a computing device for performance metric calculations.

A user may utilize a computing device for various purposes, such as for business and/or recreational use. As used herein, the term computing device refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, a mobile device refers to devices that are (or can be) carried and/or worn by a user.

In some examples, the computing device can be communicatively coupled to a remote computing resource and/or cloud resource. In some examples, the computing device can be utilized by a device or system. For example, the computing device can be utilized by a printing device or other type of mechanical device that performs functions that are separate from the computing device. In some examples, the computing device can monitor performance metrics of the computing device and/or performance metrics of a device or system associated with the computing device. As used herein, performance metrics include measurable attributes of a computing device or device associated with the computing device that affects performance. For example, the performance metrics can be measurable attributes that can identify a performance compared to other computing devices or other devices. In some examples, the performance metrics can include, but are not limited to: a response time, a channel capacity, a latency, a completion time, a service time, a bandwidth, a throughput, a power consumption, a performance per watt, a CPU benchmark, a speed, among other metrics that can be utilized to measure a performance.

In some examples, the computing device can collect performance data and/or performance metrics associated with the computing device over a period of time. In some examples, the computing device can provide the collected performance metrics to a computing resource and/or cloud resource to be processed and/or utilized to perform a particular calculation (e.g., performance metric calculation, etc.). These types of calculations can be difficult to process when the computing resource is receiving performance metrics from a relatively high quantity of computing devices and/or systems. In some examples, the computing device may utilize results associated with the performance metrics to monitor performance of the computing device. Thus, the computing device can request the results associated with the performance metrics from the computing resource periodically, which can take a relatively large quantity of resources to be utilized by the computing resource.

The present disclosure relates to executing performance metric calculations on edge devices during a determined downtime to lower the resources utilized by the computing resources. In some examples, the performance metrics can be collected by the individual devices and stored on the device as performance metrics. These performance metrics can be utilized to perform a calculation or plurality of calculations to generate performance data for the device. In some examples, the device can receive an agent from the computing resource that would normally perform the calculation on the performance metrics. As used herein, an agent can be a set of instructions that can be activated to perform a particular function and/or deactivated to prevent resources from being used executing the agent. In this way, the computing resource or cloud resource can provide an agent to a plurality of computing devices (e.g., edge devices) to perform the performance metric calculation when the agent is activated.

The present disclosure monitors activity of a computing device that receives the agent to determine a particular time period to activate the agent and allow the agent to perform a performance metric calculation for the computing resource and/or cloud resource. In this way, the computing device and/or a plurality of computing devices can perform performance metric calculations on behalf of the computing resource and/or cloud resource without affecting the performance of the computing device.

FIG. 1 illustrates an example of a computing device 102 for performance metric calculations. In some examples the computing device 102 can include a processor resource 104 communicatively coupled to a memory resource 106. As described further herein, the memory resource 106 can include instructions 108, 110, 112, 114, 116 that can be executed by the processor resource 104 to perform particular functions. In some examples, the computing device 102 can be associated with a printing device and/or imaging device (e.g., camera, scanner, optical sensor, etc.).

The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114, 116. In other examples, the computing device 102 can include instructions 108, 110, 112, 114, 116, stored on a machine-readable medium (e.g., memory resource 106, non-transitory computer-readable medium, etc.) and executable by a processor resource 104. In a specific example, the computing device 102 utilizes a non-transitory computer-readable medium storing instructions 108, 110, 112, 114, 116, that, when executed, cause the processor resource 104 to perform corresponding functions.

In some examples, the computing device 102 can include instructions 108 to generate a model of activity for the computing device 102. As used herein, a model of activity for the computing device 102 can include a representation of when the computing device 102 is being utilized and/or when the computing device 102 is not being utilized or utilized at a relatively lower level. In some examples, the model of activity can be a representation of a percentage of utilization over a period of time. For example, the model of activity can be a graphical representation of log on periods and log off periods for the computing device 102. As used herein, a log on period can be a time period where a user is logged into a user interface of the computing device 102. As used herein, a log off period can be a time period where a user is not logged into a user interface of the computing device 102.

In some examples, the model of activity can be utilized to identify particular periods of time that have a relatively low level activity or user interaction with the computing device 102. In this way, a period of time can be selected to activate an agent to perform a calculation utilizing the performance metrics that will not affect a performance of the computing device 102 for a user. In this way, the resources of the computing device 102 can be utilized on behalf of the computing resource or cloud resource without negatively affecting the user experience or performance of the computing device 102 when utilized by a user.

In some examples, the computing device 102 can include instructions 110 to determine a time period for performing a calculation based on the model, wherein the calculation utilizes performance metrics associated with the computing device 102. As used herein, a time period can include a time window with a particular start time and a particular end time. In some examples, the time period can include a particular quantity of continuous time that can be selected to perform the calculation utilizing performance metrics. In some examples, the time period can be a particular quantity of time that is predicted to be utilized by the computing device 102 to perform the calculation. For example, the computing device 102 can include particular hardware and/or instructions that can affect a performance or capability of the computing device 102 to perform the calculation. In this way, a quantity of time for the time period can be based on the hardware and/or instructions (e.g., software, etc.) of the computing device 102.

In some examples, the activity information utilized to determine the time period can include an application status, processor utilization, calendar information, and input/output information. For example, an idle application status can indicate that a user is not utilizing the application. In another example, the processor utilization can indicate how extensively a processor is currently being utilized to perform functions or indicate a quantity of tasks being performed by the processor resource 104. In another example, calendar information can indicate when a particular user may be away from the computing device 102 or indicate when a user typically utilizes the computing device 102. Furthermore, input/output information can relate to a quantity of processes being performed by the computing device 102 and/or a quantity of processes being performed between the computing device 102 and other devices. This type of activity information can indicate when the computing device 102 may be capable of activating the agent to perform the calculation without interrupting the performance of the computing device 102.

In some examples, the time period can be a particular window of time that can be selected within a particular day, week, or month to be executed. For example, the model can indicate different times within a day, week, and/or month that may have relatively low activity or interaction with a user. In this example, the time period can be selected based on the model, such that the quantity of time of the time period can be within a window of time that has relatively low activity or interaction with the user. In some examples, the time period can be selected such that time between the start time and the end time are a continuous period of time that has relatively low activity or interaction with the user. In this way, the user may not notice a performance degradation of the computing device 102 when the agent of the computing device 102 is performing the calculation.

In some examples, the computing device 102 can include instructions 112 to activate an agent at a start time of the time period to perform the calculation. In some examples, the computing device 102 can activate the agent at the start time of the time period such that the agent is capable of being executed by the computing device 102 to perform the calculation. In this way, the agent can utilize the resources of the computing device 102 to perform the calculation. In some examples, the computing device 102 can prevent the agent from being activated outside the determined time period. Prior to the agent being activated, the agent may not be capable of utilizing resources of the computing device 102 and thus may not affect a performance of the computing device 102. In some examples, the agent can be provided by a cloud resource or computing resource associated with the computing device 102. As described herein, the cloud resource or computing resource may have performed the calculation for the computing device 102 prior to providing the agent to the computing device 102.

In some examples, the cloud resource or computing resource can provide the computing device 102 with the agent when it is determined that the time period will not interrupt a user service of the computing device 102. That is, the cloud resource or computing resource can determine whether the computing device 102 has a relatively low activity time period that can be utilized for executing the agent. In these examples, the cloud resource or computing resource may not provide an agent to a computing device that does not have a time period that can be selected for executing the agent. Thus, the cloud resource or computing resource can identify computing devices that are capable of being utilized to perform the calculation without interrupting a user experience of the computing devices.

In some examples, the computing device 102 can include instructions 114 to send, by the agent, a result of the calculation to a remote computing device. As used herein, a remote computing device can be a computing device that is connected to the computing device 102 through a network. In some examples, the remote computing device can be a computing resource (e.g., server, computing server, etc.) and/or a cloud resource (e.g., cloud computing resource, etc.) that can be utilized to provide a service or function for the computing device 102. In some examples, the remote computing device can be utilized to collect performance metrics and/or performance data for a plurality of computing devices including the computing device 102.

In some examples, the result can include device information corresponding to the computing device 102. As described herein, the result can correspond to the particular computing device 102. In some examples, the device information can be utilized by the remote computing device or cloud resource to identify performance issues of the computing device 102. In other examples, the device information can be utilized to identify the type of the computing device 102 and/or device associated with the computing device 102. That is, the device information can be utilized the remote computing device or cloud resource for additional calculations performed utilizing the result from the computing device 102.

In some examples, the remote computing device can provide the agent to the computing device 102 when it is determined that the computing device 102 includes a time period that is capable of executing the agent during a relatively low activity of the computing device 102. In this way, the remote computing device can receive performance metrics from the computing device 102 and perform the calculation on the performance metrics to generate performance data for the computing device 102. In these examples, the remote computing device can determine that the computing device 102 includes a time period of relatively low activity that can be utilized to perform the calculation on the computing device 102 and provide the computing device 102 with the agent to perform the calculation.

In these examples, the agent can perform the calculation utilizing the resources of the computing device 102 and provide the results or performance data from the calculation to the remote computing device. In this way, the remote computing device can utilize the resources of the computing device 102 to perform the calculation that was originally performed by the remote computing device. In some examples, the remote computing device can utilize the results or performance data of the computing device 102 for other calculations that involved results or performance data from a plurality of computing devices.

In some examples, the computing device 102 can include instructions 116 to deactivate the agent in response to sending the result. As described herein, the agent can be deactivated by preventing the agent from executing instructions and/or utilizing resources of the computing device 102. In some examples, the agent can be deactivated such that the computing device 102 is restricted from executing instructions associated with the agent while the agent is deactivated. In this way, the agent is not able to lower performance of the computing device outside the time period that is selected based on the model.

In some examples, the computing device 102 can determine inactivity periods of the computing device 102 that exceed a threshold quantity of time. In some examples, the threshold quantity of time can correspond to a quantity of time that may be needed for the computing device to perform the calculation. Thus, the computing device 102 can determine when periods of time with particular levels of inactivity exceeds a threshold quantity of time can identify the periods or similar future periods as the time period to perform the calculation.

In some examples, the computing device 102 can include instructions to determine, at the start time of the time period, when the computing device 102 is in a logged on mode at the start time of the time period. As used herein, a logged on mode can be a mode when a user of the computing device 102 is logged into the computing device 102. In some examples, the logged on mode can indicate that a particular user is utilizing the computing device 102 for a particular function. In some examples, the computing device 102 can include instructions to prevent the agent from being activated when the computing device 102 is in the logged on mode at the start time of the time period. In a similar way, the computing device 102 can include instructions to activate the agent when the computing device 102 is in a logged off mode at the start time of the time period. That is, the computing device 102 can deactivate the agent or prevent the agent from being activated when a user is logged on to the computing device 102.

In some examples, the computing device 102 can include instructions to determine a log on event of the device and deactivate the agent in response to the log on event. In this way, the computing device 102 can monitor log on or log off events that can occur during the time period and respond by deactivating the agent in order to preserve a performance of the computing device 102 for the user of the computing device 102.

Figure 2:
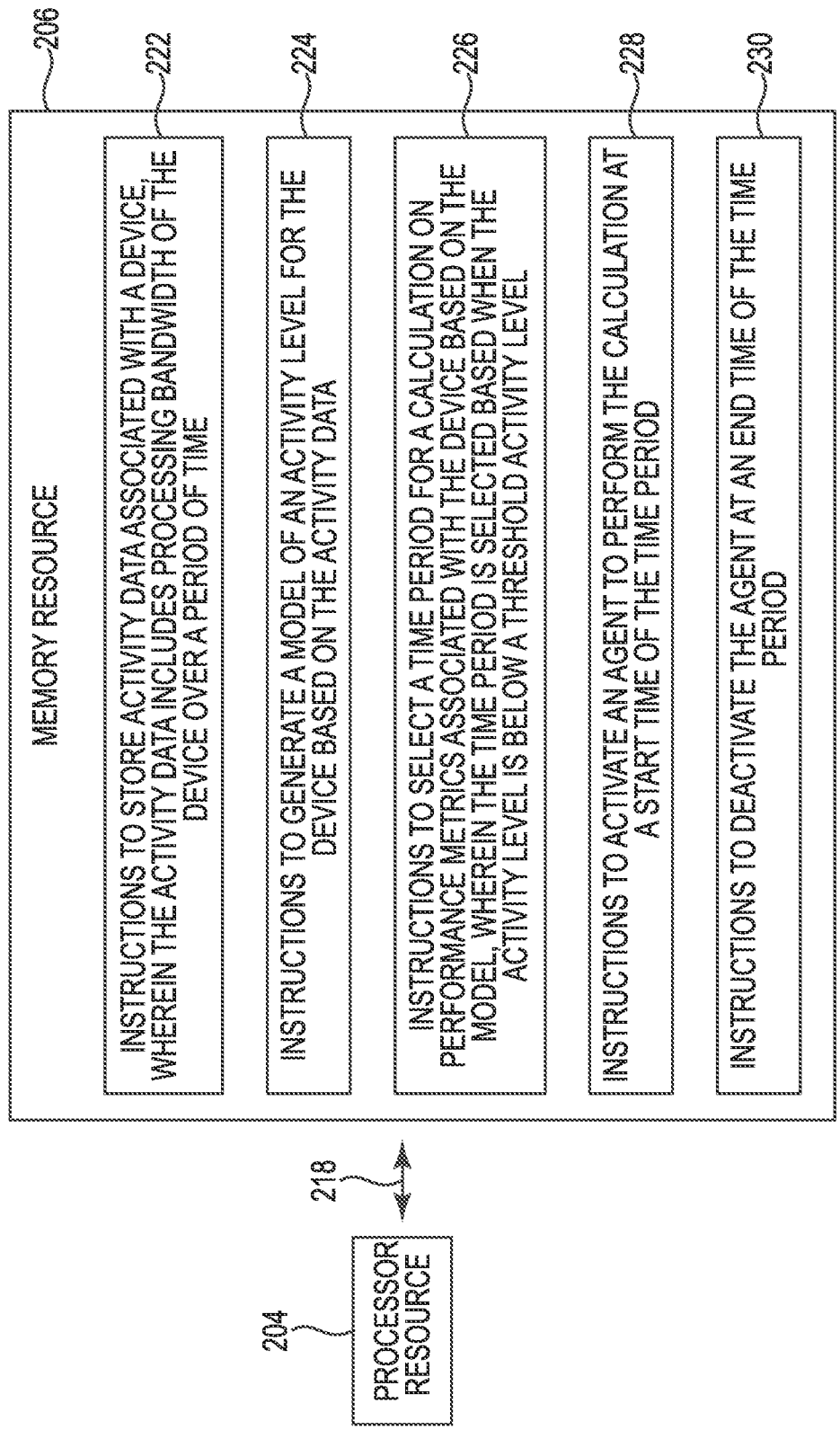
FIG. 2 illustrates an example of a memory resource storing instructions for performance metric calculations.

FIG. 2 illustrates an example of a memory resource 206 storing instructions for performance metric calculations. In some examples, the memory resource 206 can be a part of a computing device or controller that can be communicatively coupled to a computing system. For example, the memory resource 206 can be part of a computing device 102 as referenced in FIG. 1. In some examples, the memory resource 206 can be communicatively coupled to a processor resource 204 that can execute instructions 222, 224, 226, 228, 230 stored on the memory resource 206. For example, the memory resource 206 can be communicatively coupled to the processor resource 204 through a communication path 218. In some examples, a communication path 218 can include a wired or wireless connection that can allow communication between devices and/or components within a single device.

The memory resource 206 may be electronic, magnetic, optical, or other physical storage device that stores executable instructions. Thus, a non-transitory machine readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine readable medium (e.g., a memory resource 206) may be disposed within a controller and/or computing device. In this example, the executable instructions 222, 224, 226, 228, 230 can be "installed" on the device. Additionally, and/or alternatively, the non-transitory machine readable medium (e.g., a memory resource) can be a portable, external or remote storage medium, for example, that allows a computing system to download the instructions 222, 224, 226, 228, 230 from the portable/external/remote storage medium. In this situation, the executable instructions may be part of an "installation package". As described herein, the non-transitory machine readable medium (e.g., a memory resource 206) can be encoded with executable instructions for performing performance metric calculations.

The instructions 222, when executed by a processor resource such as the processor resource 204, can include instructions to store activity data associated with a device, wherein the activity data includes processing bandwidth of the device over a period of time. As described herein, the activity data can be a period of log on activity and/or a period of log off activity. In other examples, the activity data may not be associated with a log on event or log off event. In these examples, the activity data can be bandwidth or processing bandwidth of the device to determine when a processor resource 204 utilization is below a threshold utilization. In this way, the activity data can be utilized to determine when the processor resource 204 is operating at a relatively low level and includes a relatively high bandwidth for performing operations such as a calculation. Predicting time periods based on a model of activity for the processor resource 204 can ensure that a performance of a computing device associated with the processor resource 204 is not lowered while the computing device is being utilized to perform end user operations.

The instructions 224, when executed by a processor resource such as the processor resource 204, can include instructions to generate a model of an activity level for the device based on the activity data. As described herein, the activity level metrics for a computing device can be utilized to generate a model of activity for the computing device. In some examples, the model can be a representation of the activity of the computing device over a period of time. In some examples, the model can be utilized to predict future times that the computing device will likely experience a relatively low activity level and provide a relatively high bandwidth to perform other functions. In some examples, the model can be utilized to determine when a time period includes a quantity of time that can be utilized to perform a calculation while the activity level is below a threshold and/or while the bandwidth is above a threshold. In this way, the calculation can be performed during a time period that will not negatively affect a user experience with the computing device.

The instructions 226, when executed by a processor resource such as the processor resource 204, can include instructions to select a time period for a calculation on performance metrics associated with the device based on the model, wherein the time period is selected based when the activity level is below a threshold activity level. As described herein, the selected time period can be a quantity of time that corresponds to a predicted time when the computing device will be operating at a relatively low level and will give the computing device enough time to complete a calculation. As described herein, the quantity of time that is selected for the period of time can be based on the hardware and/or instructions associated with the computing device or a prediction of the quantity of time it will take for the computing device to perform the calculation. In this way, the time period can be selected such that the calculation can be performed and/or completed during a time when the computing device is predicted to be in a relatively low activity state and/or have a relatively high processor bandwidth.

The instructions 228, when executed by a processor resource such as the processor resource 204, can include instructions to activate an agent to perform the calculation at a start time of the time period. As described herein, the agent can be provided to the memory resource 206 by a remote computing device such as a computing resource or cloud resource. In some examples, the processor resource 204 can be prevented from executing the agent outside of the selected time period to prevent resources from being utilized on the agent outside of the selected time period. That is, the agent can be activated during the selected time period and deactivated outside the selected time period.

The instructions 230, when executed by a processor resource such as the processor resource 204, can include instructions to deactivate the agent at an end time of the time period. When the end time of the time period is determined, the agent can be deactivated. In this way, the calculation can end and the agent can be prevented from utilizing resources outside of the time period. In some examples, the agent can be deactivated prior to the end time of the time period. For example, the agent can be prematurely deactivated (e.g., deactivated before the end time) when the calculation is completed prior to the end time, an activity level exceeds a threshold, and/or when a bandwidth level falls below a threshold. In this way, an unexpected or unpredicted activity of a user can result in the calculation being deactivated such that the performance of the computing device for the user can be prioritized.

In some examples, the memory resource 206 can include instructions to install the agent to perform the calculation. In these examples, the calculation can be previously performed by a centralized cloud resource. In some examples, the agent can be received by the centralized cloud resource and installed by the processor resource 204. As used herein, a centralized cloud resource can include a cloud computing resource that receives data or performs a function for a plurality of devices.

In some examples, the memory resource 206 can include instructions to prevent activity data from being provided to the centralized cloud resource in response to installing the agent. As described herein, when the agent is installed, the activity data or performance data that was previously provided to the centralized cloud resource can be stored locally on the memory resource 206 or an accessible memory resource. In this way, the activity data and/or performance data can be utilized by the agent to perform a calculation or determine a time period to perform the calculations.

In some examples, the memory resource 206 can include instructions to generate a queue for the activity data to be utilized to perform the calculation based on an identified priority of the activity data. As used herein, a queue can include an organized or categorized list to perform a particular task. In some examples, the activity data and/or performance data can correspond to particular event data. In some examples, the activity data can correspond to an event with a higher priority for the computing device. In this way, the corresponding activity data can be assigned a corresponding priority and the calculation that utilizes the data can be put into a queue based on the priority.

Figure 3:
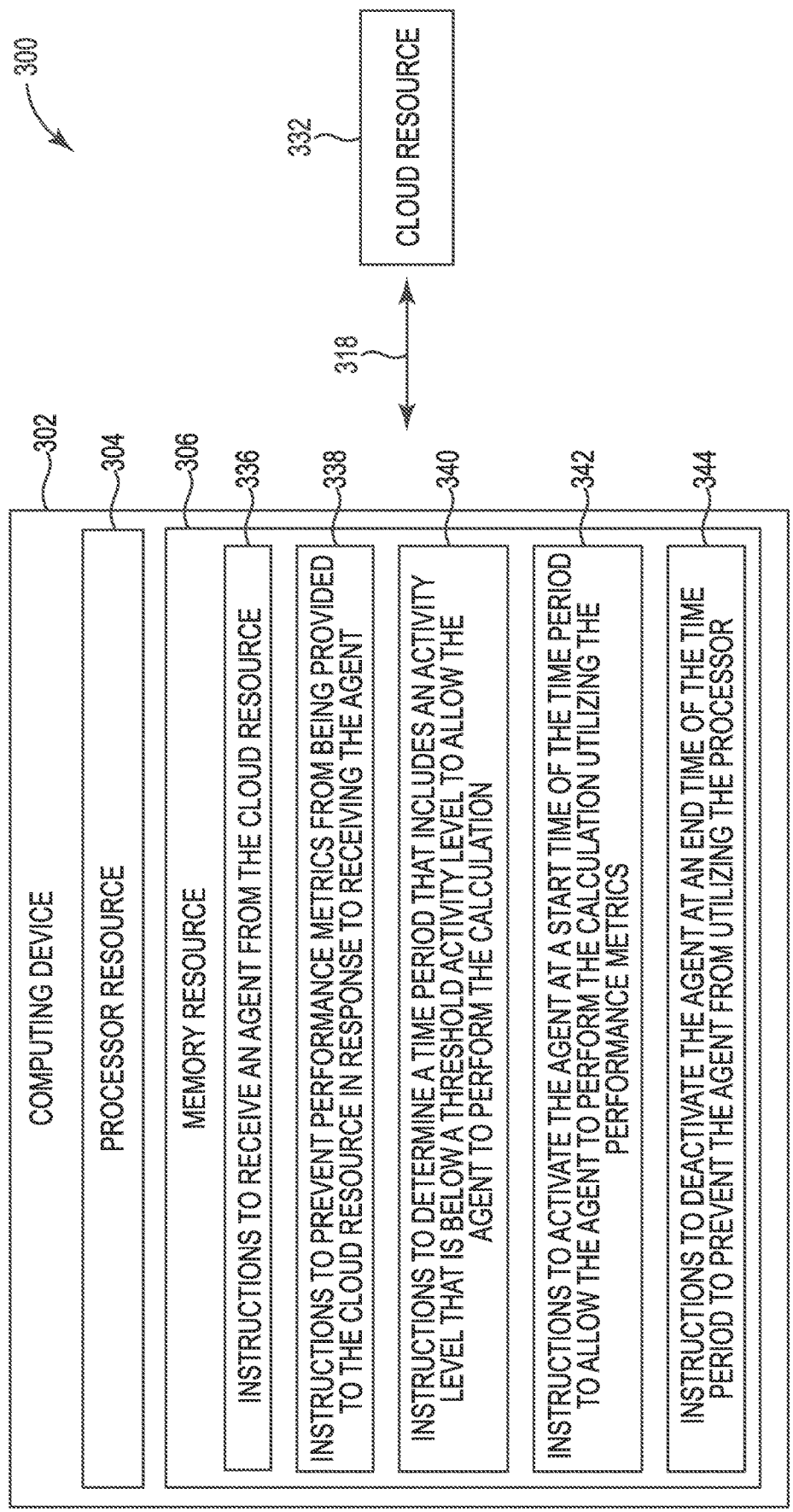
FIG. 3 illustrates an example of a system including a computing device for performance metric calculations.

FIG. 3 illustrates an example of a system 300 including a computing device 302 for performance metric calculations. In some examples the computing device 302 can be a device that includes a processor resource 304 communicatively coupled to a memory resource 306. As described herein, the memory resource 306 can include or store instructions 336, 338, 340, 342, 344, that can be executed by the processor resource 304 to perform particular functions.

In some examples, the computing device 302 can be communicatively coupled to a cloud resource 332 using a communication path 318. The cloud resource 332 can include a processor resource and/or a memory resource that can be utilized to perform functions (e.g., calculations, etc.) as a service for the computing device 302. In this way, the computing device 302 can send instructions to the cloud resource 332 through the communication path 318 to instruct the cloud resource 332 to perform a particular function.

In some examples, the computing device 302 can include instructions 336 that can be executed by a processor resource 304 to receive an agent from the cloud resource 332. As described herein, the cloud resource 332 can receive performance metrics from the computing device 302 to perform calculations. In some examples, the cloud resource 332 can determine that the computing device 302 may have time periods that could be utilized to perform the calculations without affecting a performance of the computing device 302 with a user. In these examples, the cloud resource 332 can send the agent to the computing device 302 and instruct the computing device 302 to perform the calculation utilizing the agent during a selected time period. In this way, the cloud resource 332 can utilize the computing device 302 to perform a calculation and receive the results from the computing device 302 instead of the performance metrics.

In some examples, the computing device 302 can include instructions 338 that can be executed by a processor resource 304 to prevent performance metrics from being provided to the cloud resource 332 in response to receiving the agent. As described herein, the computing device 302 may be designed to transmit performance metrics to the cloud resource 332 periodically such that the cloud resource 332 can perform a calculation on the performance metrics. When the computing device receives the agent, the computing device 302 can stop or be prevented from sending the performance metrics to the cloud resource 332 and begin storing the performance metrics to be utilized for a calculation to be performed by the agent.

In some examples, the computing device 302 can include instructions 340 that can be executed by a processor resource 304 to determine a time period that includes an activity level that is below a threshold activity level to allow the agent to perform the calculation. As described herein, a model of activity level for the computing device 302 can be utilized to predict the time period for performing the calculation. In these examples, the activity level can correspond to a quantity of tasks being executed by a user, bandwidth of a processor resource 304, a log on or log off event, among other activity level metrics for the computing device 302. In some examples, the time period can be a predicted quantity of time that will be below the threshold activity level. In this way, the agent can be activated to perform the calculation during a period of relatively low activity level for the computing device 302.

In some examples, the computing device 302 can include instructions 342 that can be executed by a processor resource 304 to activate the agent at a start time of the time period to allow the agent to perform the calculation utilizing the performance metrics. As described herein, the start time of the time period can be identified and the agent can be activated by the computing device to perform the calculation utilizing the performance metrics that are were stored instead of transmitted to the cloud resource 332. In this way, the cloud resource 332 may no longer receive the performance metrics from the computing device 302. In some examples, the computing device can activate the agent to perform the calculation and monitor the activity level and/or bandwidth of the computing device 302 to determine if the activity level exceeds a particular threshold during the time period. In this way, if a user or process beings at the computing device 302, the agent can be deactivated to avoid lowering performance of the computing device 302 during the time period for a user of the computing device 302.

In some examples, the computing device 302 can include instructions 344 that can be executed by a processor resource 304 to deactivate the agent at an end time of the time period to prevent the agent from utilizing the processor. As described herein, the computing device 302 can deactivate the agent when the end time of the time period is detected or identified such that the agent is not capable of utilizing resources of the computing device 302 outside of the selected time period. In some examples, the calculation can be completed to generate performance data and/or results that can be transmitted to the cloud resource 332 through the communication path 318.

Figure 4:
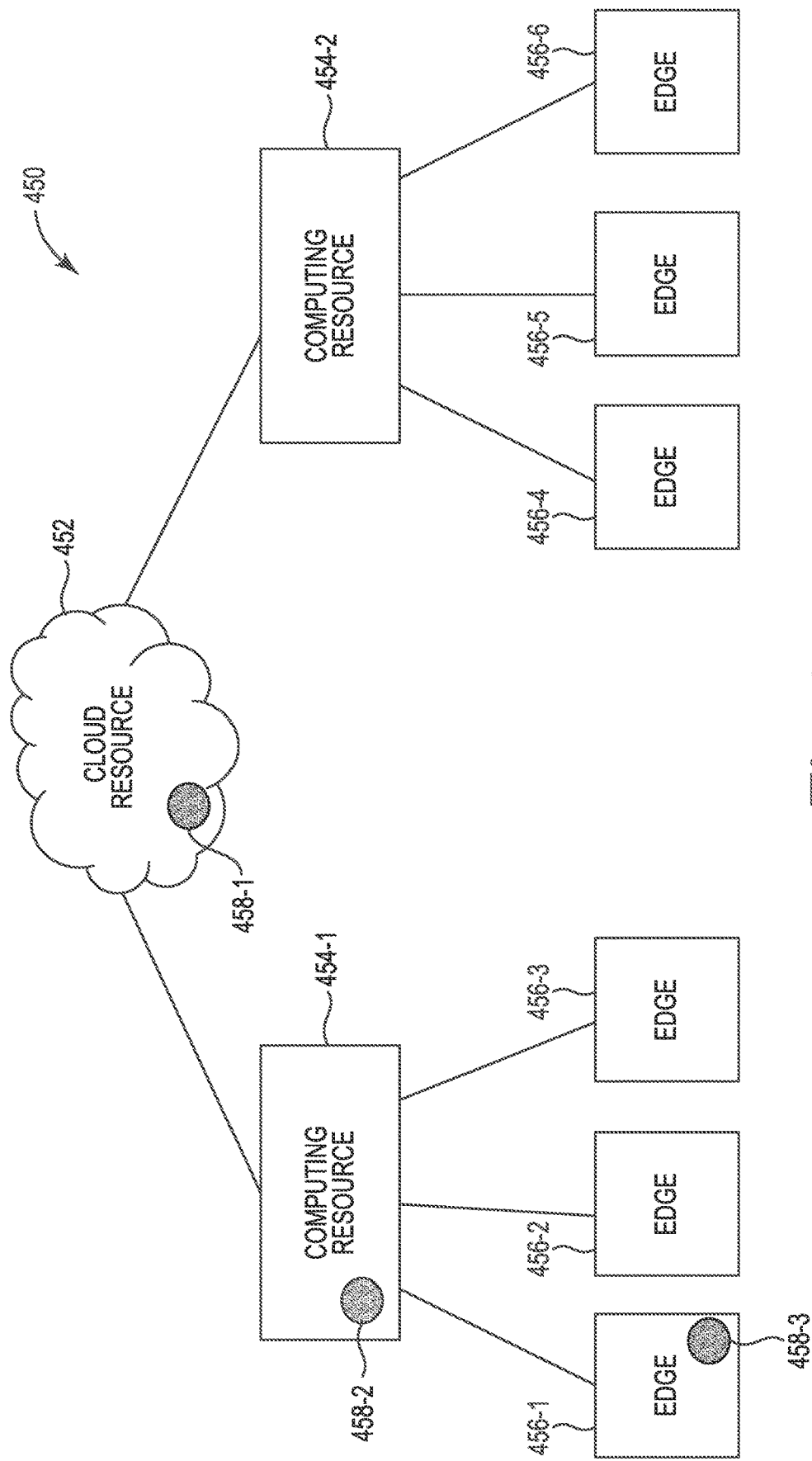
FIG. 4 illustrates an example of a system for performance metric calculations.

FIG. 4 illustrates an example of a system 450 for performance metric calculations. In some examples, the system 450 can illustrate a computing environment that includes a plurality of computing devices that are communicatively coupled. In some examples, the system 450 can include a cloud resource 452. In some examples, the cloud resource 452 can be generated by a first computing resource 454-1 and/or second computing resource 454-2. In some examples, the first computing resource 454-1 and/or second computing resource 454-2 can be computer servers or other types of remote computing devices that can provide services for edge devices such as the plurality of computing devices 456-1, 456-2, 456-3, 456-4, 456-5, 456-6, referred together herein as 456.

In some examples, the plurality of computing devices 456 can each be computing devices with corresponding processor resources and memory resources. As described herein, the plurality of computing devices 456 can each be part of a particular device or system that can include different performance metrics. In other examples, the plurality of computing devices 456 can be personal computing devices associated with corresponding users. That is, the plurality of computing devices 456 can provide similar functions or different functions for corresponding users. In some examples, the plurality of computing devices 456 can send performance metrics to the first computing resource 454-1 and/or second computing resource 454-2 and a calculation can be performed by the cloud resource 452. As described herein, this can become burdensome for the cloud resource 452 as the quantity of the plurality of computing devices 456 increases and/or the quantity of performance metrics increase.

In some examples, the first computing resource 454-1 and/or second computing resource 454-2 can provide an agent to the plurality of computing devices 456 or a portion of the plurality of computing devices 456. As described herein, the plurality of computing devices 456 can determine whether a time period exists to perform a calculation that is currently performed by the first computing resource 454-1, second computing resource 454-2, and/or the cloud resource 452. When a computing device of the plurality of computing devices 456 determines that a time period of relatively low activity or relatively high bandwidth to perform the calculation, the first computing resource 454-1 and/or second computing resource 454-2 can provide the computing device with the agent to perform the calculation.

In a specific example, the cloud resource 452 can include a calculation agent 458-1 that can perform the performance calculation for performance metrics received by the plurality of computing devices 456. In this way, the plurality of computing devices 456 can provide the performance metrics to the first computing resource 454-1 and/or second computing resource 454-2, which can be provided to the cloud resource 452. In this specific example, the first computing resource 454-1 can include a copy of the calculation agent 458-2 and provide the calculation agent 458-3 to the computing device 456-1 when the computing device 456-1 includes resources that can be utilized to execute the calculation. That is, the computing device 456-1 can have a time period to execute the calculation agent 458-3 and the computing device 456-1 can being performing the calculation utilizing the calculation agent 458-3 instead of providing the performance metrics to the first computing resource 454-1.

In some examples, the plurality of computing devices 456 can stop or be prevented from sending the performance metrics to the first computing resource 454-1 and/or second computing resource 454-2. In these examples, the plurality of computing devices 456 can identify a time period for activating the agent to perform the calculation utilizing the performance metrics. As described herein, the plurality of computing devices 456 can store the performance metrics on the corresponding computing device and the agent can utilize the stored performance metrics for the calculation. As described herein, the plurality of computing devices 456 can each perform a corresponding calculation utilizing the corresponding received agent from the first computing resource 454-1 and/or second computing resource 454-2 and provide the result of the calculation to the first computing resource 454-1 and/or second computing resource 454-2.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device, comprising:
a processor resource; and
a non-transitory memory resource storing machine-readable instructions stored thereon that, when executed, cause the processor resource to:
generate a model of activity for the computing device;
determine a time period for performing a calculation based on the model, wherein the calculation utilizes performance metrics associated with the computing device;
activate an agent at a start time of the time period to perform the calculation;
send, by the agent, a result of the calculation to a remote computing device; and
deactivate the agent in response to sending the result.

2. The computing device of claim 1, comprising instructions to cause the processor resource to determine inactivity periods of the computing device that exceed a threshold quantity of time.

3. The computing device of claim 1, wherein the result includes device information corresponding to the computing device.

4. The computing device of claim 1, wherein the processor resource is to prevent the agent from being activated outside the determined time period.

5. The computing device of claim 1, wherein the processor resource is to determine, at the start time of the time period, when the computing device is in a logged on mode at the start time of the time period.

6. The computing device of claim 5, wherein the processor resource is to prevent the agent from being activated when the computing device is in the logged on mode at the start time of the time period.

7. The computing device of claim 5, wherein the processor resource is to activate the agent when the computing device is in a logged off mode at the start time of the time period.

8. A non-transitory memory resource storing machine-readable instructions stored thereon that, when executed, cause a processor resource to:
store activity data associated with a device, wherein the activity data includes processing bandwidth of the device over a period of time;
generate a model of an activity level for the device based on the activity data;
select a time period for a calculation on performance metrics associated with the device based on the model, wherein the time period is selected based when the activity level is below a threshold activity level;
activate an agent to perform the calculation at a start time of the time period; and
deactivate the agent at an end time of the time period.

9. The memory resource of claim 8, comprising instructions to cause the processor resource to:
determine a log on event of the device; and
deactivate the agent in response to the log on event.

10. The memory resource of claim 9, wherein the log on event occurs within the selected time period.

11. The memory resource of claim 8, comprising instructions to cause the processor resource to:
install the agent to perform the calculation, wherein the calculation was previously performed by a centralized cloud resource;
prevent activity data from being provided to the centralized cloud resource in response to installing the agent; and
generate a queue for the activity data to be utilized to perform the calculation based on an identified priority of the activity data.

12. A system, comprising:
a cloud resource to collect performance metrics associated with a plurality of devices and to perform a calculation utilizing the performance metrics; and
a computing device, comprising a processor to:
receive an agent from the cloud resource;
prevent performance metrics from being provided to the cloud resource in response to receiving the agent;
determine a time period that includes an activity level that is below a threshold activity level to allow the agent to perform the calculation;
activate the agent at a start time of the time period to allow the agent to perform the calculation utilizing the performance metrics; and
deactivate the agent at an end time of the time period to prevent the agent from utilizing the processor.

13. The system of claim 12, wherein the processor is to send a result of the calculation to the cloud resource.

14. The system of claim 13, wherein the cloud resource is to utilize the result with corresponding results associated with the plurality of devices.

15. The system of claim 12, wherein the time period is determined utilizing activity information including an application status, processor utilization, calendar information, and input/output information.

\* \* \* \* \*